US012557801B2

(12) United States Patent　(10) Patent No.: US 12,557,801 B2
Chen　(45) Date of Patent: Feb. 24, 2026

(54) REEL LINE GUIDE DEVICE, BAITCAST REEL AND FISHING TACKLE

(71) Applicant: Shenzhen Bosaidong Technology Co., Ltd., Guangdong (CN)

(72) Inventor: Hong Chen, Guangdong (CN)

(73) Assignee: Shenzhen Bosaidong Technology Co., Ltd., Shenzhen (CN)

( * ) Notice: Subject to any disclaimer, the term of this patent is extended or adjusted under 35 U.S.C. 154(b) by 251 days.

(21) Appl. No.: 18/209,495

(22) Filed: Jun. 14, 2023

(65) Prior Publication Data

US 2023/0397590 A1　Dec. 14, 2023

(30) Foreign Application Priority Data

Jun. 14, 2022　(CN) .......................... 202210670448.9

(51) Int. Cl.
*A01K 89/015*　(2006.01)

(52) U.S. Cl.
CPC ................................ *A01K 89/0175* (2015.05)

(58) Field of Classification Search
CPC ........ A01K 89/01912; A01K 89/01914; A01K 89/01915; A01K 89/01918; A01K 89/0176; A01K 89/01916; A01K 89/015; A01K 89/033; F16D 43/26; F16H 19/001
USPC ....................................................... 242/223
See application file for complete search history.

(56) References Cited

U.S. PATENT DOCUMENTS

| | | | | |
|---|---|---|---|---|
| 2,493,428 A | * | 1/1950 | Tschus ................. | A01K 89/033 242/277 |
| 3,111,287 A | * | 11/1963 | Baenziger ............ | A01K 89/015 242/280 |
| 3,598,334 A | * | 8/1971 | Fleischer ............. | A01K 89/015 242/277 |
| 3,624,798 A | * | 11/1971 | Fleischer ............. | A01K 89/015 242/483.8 |
| 3,993,264 A | * | 11/1976 | Kamikawa ....... | A01K 89/01916 242/277 |
| 4,043,521 A | * | 8/1977 | Hull ................. | A01K 89/01916 242/310 |
| 4,799,628 A | * | 1/1989 | Watanabe ........ | A01K 89/01916 242/280 |
| 5,850,979 A | * | 12/1998 | Murayama ......... | A01K 89/0193 242/279 |

(Continued)

FOREIGN PATENT DOCUMENTS

WO　WO-2021177058 A1 *　9/2021　............. F02B 37/16

*Primary Examiner* — Anna M Momper
*Assistant Examiner* — Henrix Soto

(57)　ABSTRACT

A reel line guide device for use in a baitcast reel is disclosed, the reel line guide device including: a mount provided with a mounting position for accommodating a reel assembly; a guide arranged on the mount and positioned on one side of the mounting position, the guide being provided with a passage hole for a fishing line on the reel assembly to pass through; and a button transmission mechanism arranged on the mount and including a button assembly and a transmission assembly, the transmission assembly being connected to the button assembly and the guide to drive the guide to rotate under the action of the button assembly, so as to adjust an angle of the passage hole of the guide relative to the reel assembly. A baitcast reel having the above-mentioned reel line guide device, and a fishing tackle are further disclosed.

17 Claims, 6 Drawing Sheets

10

(56)                References Cited

U.S. PATENT DOCUMENTS

| | | | |
|---|---|---|---|
| 6,109,555 A * | 8/2000 | Svenson | A01K 89/0155 |
| | | | 242/301 |
| 9,456,595 B2 * | 10/2016 | Umezawa | A01K 89/01918 |
| 9,545,088 B2 * | 1/2017 | Umezawa | A01K 89/01918 |
| 2017/0328421 A1 * | 11/2017 | Ahmad | A01K 89/01901 |

* cited by examiner

10

REEL LINE GUIDE DEVICE, BAITCAST REEL AND FISHING TACKLE

CROSS REFERENCE TO RELATED APPLICATIONS

The present application claims the benefit of Chinese Patent Application No. 202210670448.9 filed on Jun. 14, 2022, the contents of which are incorporated herein by reference in their entirety.

TECHNICAL FIELD

The present disclosure relates to the field of fishing tackles, and in particularly to a reel line guide device, a baitcast reel and a fishing tackle.

BACKGROUND

A baitcast reel is one of the necessary fishing tackles for fishing with telescopic fishing rods. In an existing baitcast reel line guide system, line retrieving and pitching are carried out through the same guide hole of a guide. The line guide system has the largest disadvantage in that the functional requirements of a user in retrieving and pitching states of a reel assembly cannot be both taken into account. That is to say, during retrieving, it is required to minimize the guide hole in order to allow a fishing line to be wound uniformly, smoothly and attractively around the reel assembly; however, during pitching, it is required to maximize the guide hole in order to avoid a reduced bait casting distance and an undesirable water entry point due to a friction between the fishing line running at a high speed and an inner wall of the guide.

At present, a smaller guide hole of a guide in the market is preferred for the purpose of ensuring as much as possible that the fishing line is uniformly wound around the reel assembly during retrieving. However, this may sacrifices a lot of casting experiences. During bait casting, due to the smaller guide hole, the face that the friction between the fishing line running at a high speed and the inner wall of the guide leads to the limitations on a running speed and a running trajectory of the fishing line is inevitable, which eventually results in a reduced casting distance, an undesirable water entry point of a bait, and a low catch success rate.

SUMMARY

The technical problem to be solved by the present disclosure is to provide a reel line guide device, a baitcast reel and a fishing tackle, which can improve the fishing experience of a user.

In order to solve the above-mentioned technical problem, an aspect of the present disclosure provides a reel line guide device, including:

a mount provided with a mounting position for accommodating a reel assembly;

a guide arranged on the mount and positioned on one side of the mounting position, the guide being provided with a passage hole for a fishing line on the reel assembly to pass through; and a button transmission mechanism arranged on the mount and including a button assembly and a transmission assembly, the transmission assembly being connected to the button assembly and the guide to drive the guide to rotate under the action of the button assembly, so as to adjust an angle of the passage hole of the guide relative to the reel assembly in such a way that a movement space for the fishing line in the passage hole is increased when the baitcast reel is in a pitching state, so as to reduce the friction between the fishing line and an inner wall of the passage hole, and that the movement space for the fishing line is reduced when the baitcast reel is in a retrieving state.

A further technical solution of the present disclosure provided as follows: the transmission assembly includes a clutch cam provided with first saw teeth on a side, and a transmission gear set, the transmission gear set including a worm located on one side of the guide, a worm sleeve sleeved on the worm, a connecting seat sleeved on the worm sleeve and movable along with the worm sleeve, and a connecting gear fixed to the guide, wherein second saw teeth that mesh with the first saw teeth and third saw teeth that mesh with the connecting gear are respectively arranged on the worm sleeve and the connecting seat, and the button assembly is connected to the clutch cam so as to force the clutch cam to rotate by means of the button assembly, thereby driving the connecting gear to rotate, such that the guide rotates, along with the connecting gear, to the left or right relative to the reel assembly to adjust the angle of the passage hole of the guide relative to the reel assembly.

A further technical solution of the present disclosure provided as follows: the transmission gear set further includes a first transmission gear and a second transmission gear arranged on the mount, the first transmission gear meshing with the first saw teeth and the second transmission gear, and the second saw teeth on the worm sleeve meshing with the second transmission gear.

A further technical solution of the present disclosure provided as follows: the button assembly includes an adjustment button, a connecting rod, and a ring, a connecting post is arranged on a surface of the mount, the clutch cam is fixed to the ring, and the ring is sleeved on the connecting post and is connected to the adjustment button by means of the connecting rod, such that the ring is capable of rotating around the connecting post upon pressing the adjustment button.

A further technical solution of the present disclosure provided as follows: the transmission gear set further includes a fixing fork, one end of the fixing fork is in the form of a U-shaped opening, the worm sleeve is provided with a slot, and the U-shaped opening penetrates the connecting seat and the slot and is engaged to the worm, and the other end of the fixing fork is mounted in tight fit with the connecting seat.

A further technical solution of the present disclosure provided as follows: the reel line guide device further includes a guide seat fixed to the mount, and one end of the guide penetrates the guide seat and is then connected to the transmission assembly.

A further technical solution of the present disclosure provided as follows: the passage hole is an oval hole.

In order to solve the above-mentioned technical problem, another aspect of the present disclosure provides a baitcast reel, including a fishing reel body, a reel line guide device assembled on the fishing reel body, and a reel assembly, the reel assembly being arranged at a mounting position, and the reel line guide device being the reel line guide device described above.

In order to solve the above-mentioned technical problem, still another aspect of the present disclosure provides a fishing tackle, including the baitcast reel described above.

Compared with the prior art, the reel line guide device of the present disclosure may take into account the functional requirements of the user both in retrieving and pitching states of the reel assembly, that is, the button assembly may drive the guide to rotate to adjust the angle of the passage hole of the guide relative to the reel assembly in such a way that the movement space for the fishing line in the passage hole may be reduced when the baitcast reel is in the retrieving state, and the fishing line may be uniformly wound around the reel assembly during retrieving, and that the movement space for the fishing line in the passage hole may be increased when the baitcast reel is in the pitching state, providing enough space for the fishing line to run at a high speed in the guide, such that the undesirable limitations on the running speed and the running trajectory of the fishing line due to the friction between the fishing line and the inner wall of the guide are avoided or reduced as much as possible, the satisfaction with the casting distance and the water entry point of the bait is greatly improved, the catch success rate is increased, and the experience and fishing fun of an angler are greatly enhanced.

DESCRIPTION OF THE EMBODIMENTS

Figure 1:
FIG. 1 is a schematic perspective structural view of a specific embodiment of a reel line guide device of the present disclosure.
Figure 1:
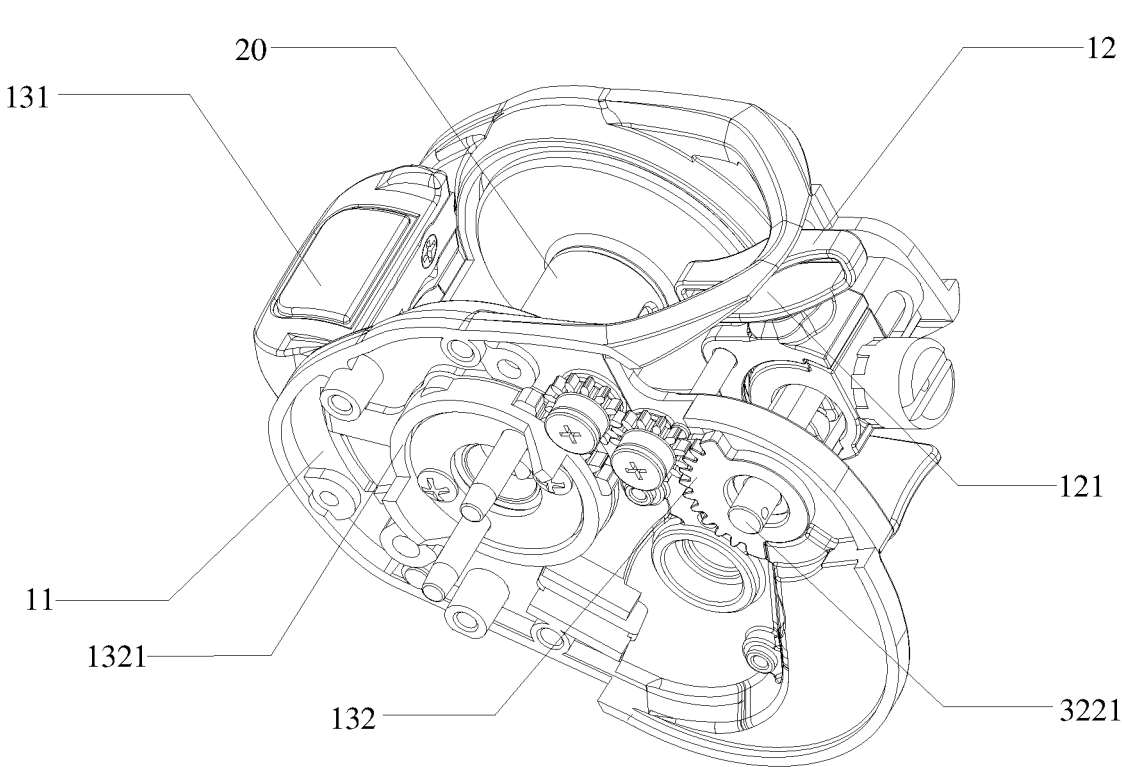
Figure 2:
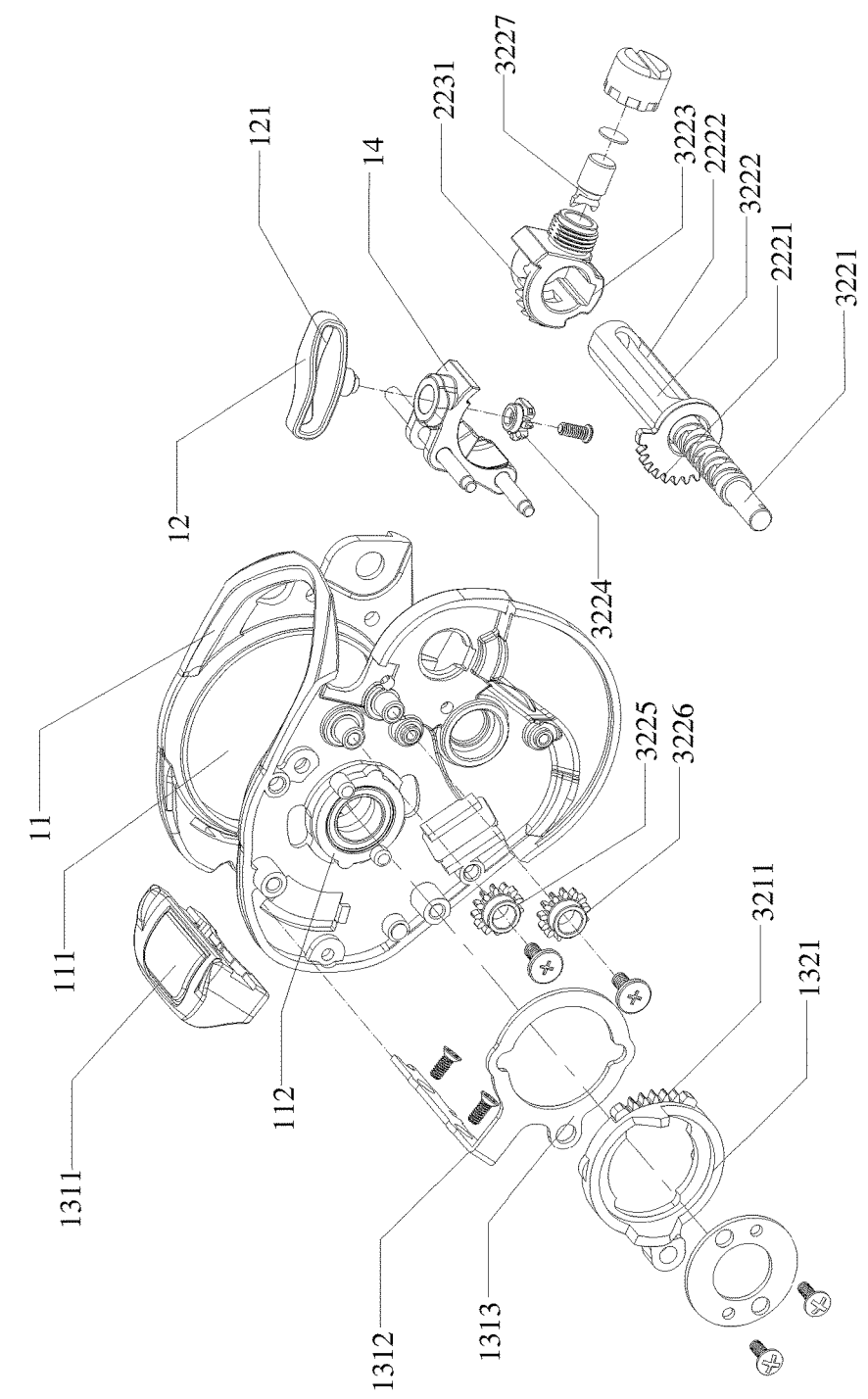
FIG. 2 is a schematic exploded structural view of the specific embodiment of the reel line guide device of the present disclosure.
Figure 3:
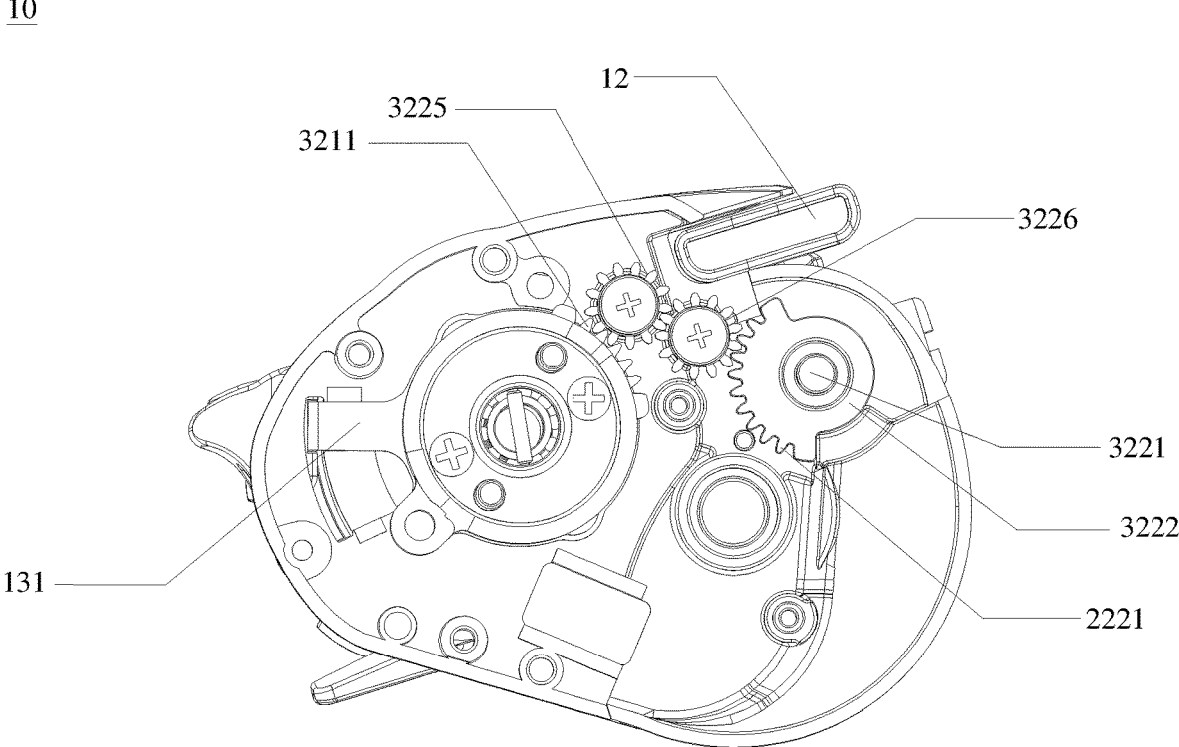
FIG. 3 is a schematic front view of the reel line guide device shown in FIG. 1.

The present disclosure will be further described below with respect to the accompanying drawings and embodiments in order to allow those of ordinary skill in the art to more clearly understand the objectives, technical solutions and advantages of the present disclosure.

Referring to FIGS. 1 to 5, FIGS. 1 to 5 illustrate a specific embodiment of a reel line guide device 10 of the present disclosure. In order to illustrate a structure such as a mount 11 more visually, a reel assembly or a fishing line is not shown in FIGS. 1 to 3. In the embodiment shown in the figures, the reel line guide device 10 includes the mount 11, a guide 12 arranged on the mount 11, and a button transmission mechanism, wherein the mount 11 is provided with a mounting position 111 for accommodating the reel assembly 20, the guide 12 is positioned on one side of the mounting position 111, the guide 12 is provided with a passage hole 121 for the fishing line 21 on the reel assembly 20 to pass through; and the button transmission mechanism includes a button assembly 131 and a transmission assembly 132. The transmission assembly 132 is connected to the button assembly 131 and the guide 12 to drive the guide 12 to rotate under the action of the button assembly 131, so as to adjust an angle of the passage hole 121 of the guide 12 relative to the reel assembly 20 in such a way that a movement space for the fishing line 21 in the passage hole 121 may be increased when a baitcast reel is in a pitching state, so as to reduce the friction between the fishing line 21 and an inner wall of the passage hole 121, and that the movement space for the fishing line 21 may be reduced when the baitcast reel is in a retrieving state. Preferably, in this embodiment, the reel line guide device 10 further includes a guide seat 14. The guide seat 14 is fixed to the mount 11, and one end of the guide 12 penetrates the guide seat 14 and is then connected to the transmission assembly 132. Also, the passage hole 121 is an oval hole, which is more conducive to expanding the movement space for the fishing line 21 in the passage hole 121.

Based on the above design, the active passage space of the passage hole 121 of the guide 12 of the present disclosure varies in two different operating states, i.e., pitching and retrieving states, that is, the guide 12 may be driven by the button assembly 131 to rotate, so as to adjust the angle of the passage hole 121 of the guide 12 relative to the reel assembly 20 in such a way that the movement space for the fishing line 21 in the passage hole 121 may be reduced when the baitcast reel is in the retrieving state. In this embodiment, the passage hole 121 is offset in this case, a major axis of the passage hole 121 is substantially perpendicular to the reel assembly 20, and the active passage space of the passage hole 121 through which the fishing line 21 may pass is minimized, such that the fishing line 21 may be uniformly wound around the reel assembly 20 during retrieving. The movement space for the fishing line 21 in the passage hole 121 may be increased in the pitching state, the passage hole 121 faces the reel assembly 20 in this case, the active passage space of the passage hole 121 is maximized, providing enough space for the fishing line 21 to run at a high speed in the guide 12, and minimizing the friction between the fishing line 21 and the inner wall of the guide 12 so as to prevent the undesirable limitations on a running speed and a running trajectory of the fishing line 21.

In some embodiments, the transmission assembly 132 includes a clutch cam 1321 provided with first saw teeth 3211 on a side, and a transmission gear set. The transmission gear set includes a worm 3221 located on one side of the guide 12, a worm sleeve 3222 sleeved on the worm 3221, a connecting seat 3223 sleeved on the worm sleeve 3222 and movable along with the worm sleeve 3222, and a connecting gear 3224 fixed to the guide 12. Second saw teeth 2221 that mesh with the first saw teeth 3211 and third saw teeth 2231 that mesh with the connecting gear 3224 are respectively arranged on the worm sleeve 3222 and the connecting seat 3223. The button assembly 131 is connected to the clutch cam 1321 so as to force the clutch cam 1321 to rotate by means of the button assembly 131, thereby driving the connecting gear 3224 to rotate, such that the guide 12 rotates, along with the connecting gear 3224, to the left or right relative to the reel assembly 20 to adjust the angle of the passage hole 121 relative to the reel assembly 20. Based on this design, the first saw teeth 3211 on the clutch cam 1321 mesh with the second saw teeth 2221 on the worm sleeve 3222 and the third saw teeth 2231 on the connecting seat 3223 mesh with the connecting gear 3224. When the worm sleeve 3222 rotates, the connection base 3223 synchronously rotates by the same angle along with the worm sleeve 3222, and connecting gear 3224 rotates accordingly, such that the active passage space of the passage hole 121 is minimized when the baitcast reel is in the retrieving state, and the active passage space of the passage hole 121 is maximized when the baitcast reel is in the pitching state.

Preferably, in this embodiment, the transmission gear set further includes a first transmission gear 3225 and a second transmission gear 3226 arranged on the mount 11. The first transmission gear 3225 meshes with the first saw teeth 3211 and the second transmission gear 3226, and the second saw teeth 2221 on the worm sleeve 3222 mesh with the second transmission gear 3226. It can be seen that in this embodiment, the guide 12 is mounted on the mount 11 by means of the guide seat 14, and the transmission between the second saw teeth 2221 and the first saw teeth 3211 is also implemented by means of the first transmission gear 3225 and the second transmission gear 3226, which is more conductive to spatial layout of the components on the mount 11.

Further, the transmission gear set further includes a fixing fork 3227, one end of the fixing fork 3227 is in the form of a U-shaped opening, the worm sleeve 3222 is provided with a slot 2222, and the U-shaped opening penetrates the connecting seat 3223 and the slot 2222 and is engaged to the worm 3221, and the other end of the fixing fork 3227 is mounted in tight fit with the connecting seat 3223. Based on the above design, the connection between the connecting seat 3223 and the worm sleeve 3222 is further stabilized by means of the fixing fork 3227.

In some embodiments, the button assembly 131 includes an adjustment button 1311, a connecting rod 1312, and a ring 1313. A connecting post 112 is arranged on a surface of the mount 11, the clutch cam 1321 is fixed to the ring 1313, the ring 1313 is sleeved on the connecting post 112 and is connected to the adjusting button 1311 by means of the connecting rod 1312, such that the ring 1313 may rotate around the connecting post 112 upon pressing the adjusting button 1311. Based on the above design, the adjustment button 1311 synchronously drives the clutch cam 1321 by means of the connecting rod 1312.

An operating process of the reel line guide device 10 of the present disclosure will be described in detail below.

Figure 4:
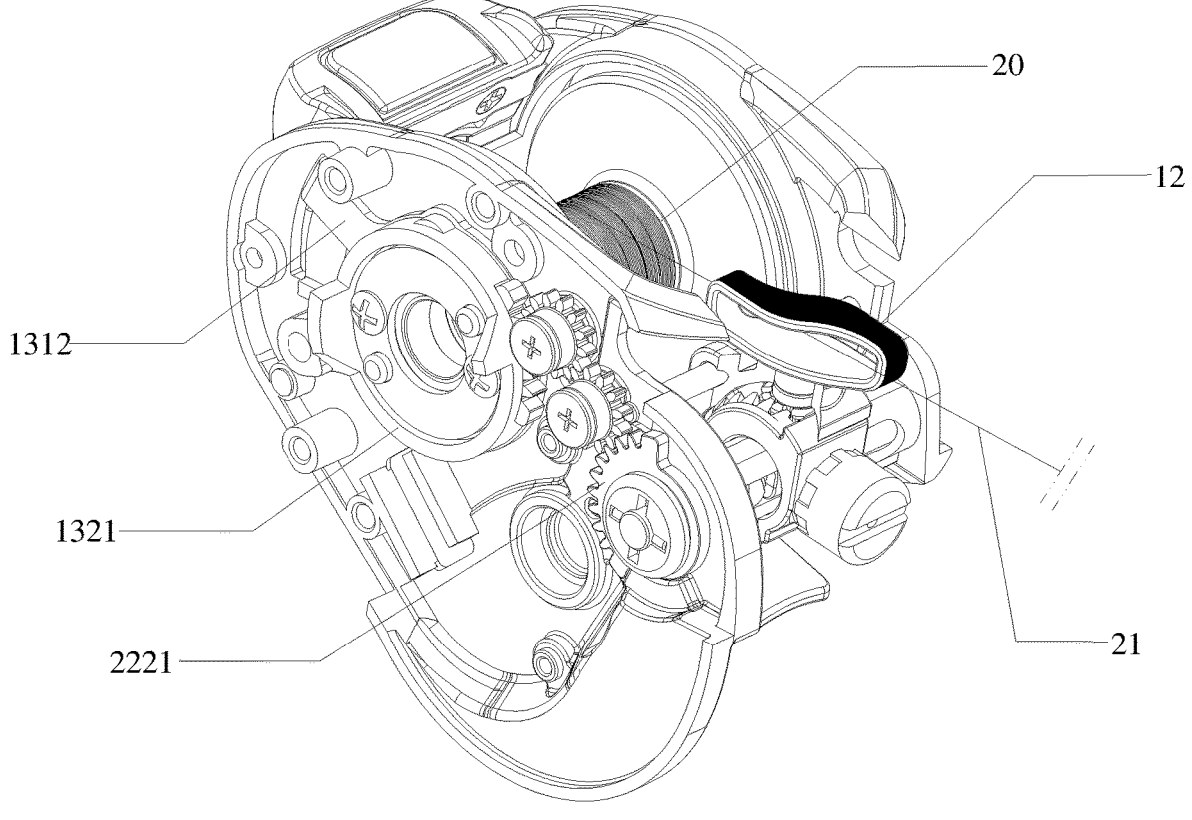
FIG. 4 is a schematic view of the operations of the reel line guide device of the present disclosure in a retrieving state.
Figure 5:
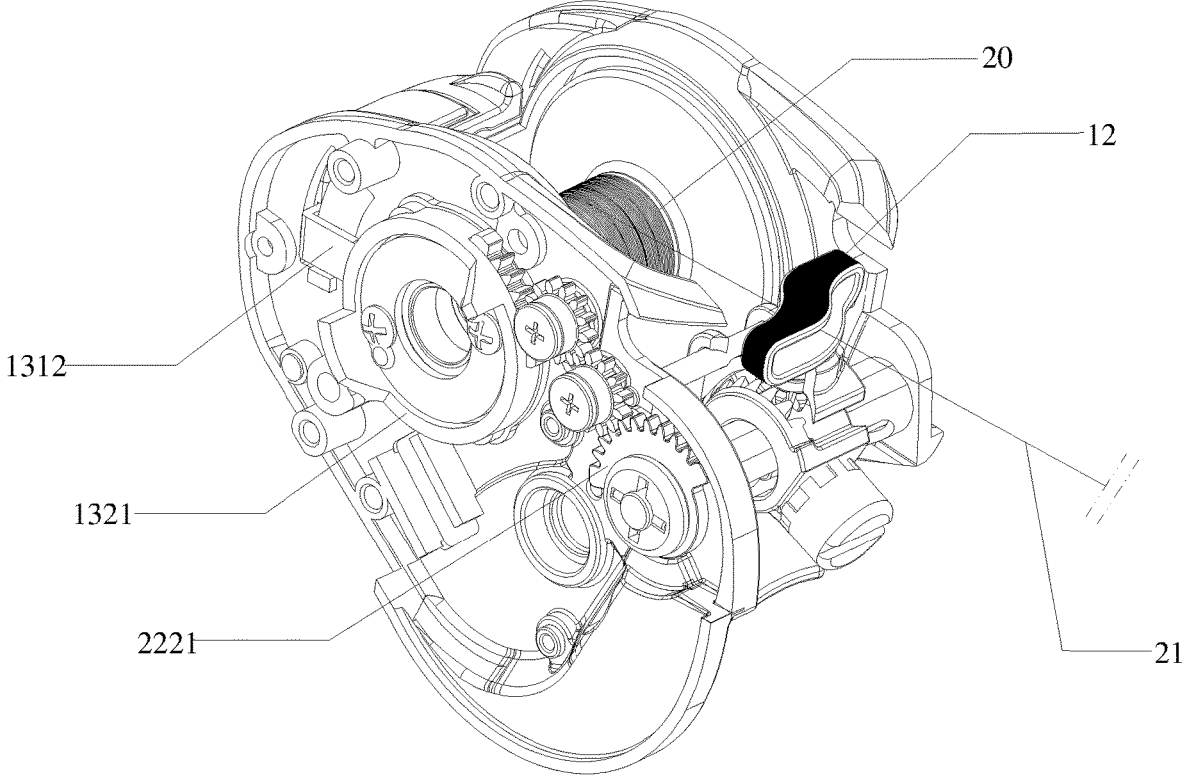
FIG. 5 is a schematic view of the operations of the reel line guide device of the present disclosure in a pitching state.

Upon pressing the adjustment button 1311, the adjustment button 1311 synchronously drives the clutch cam 1321 by means of the connecting rod 1312. Since the first saw teeth 3211 on the clutch cam 1321 mesh with the first transmission gear 3225, the first transmission gear 3225 meshes with second transmission gear 3226, and the second transmission gear 3226 meshes with the second saw teeth 2221 on the worm sleeve 3222, a linkage relationship is established, that is, the worm sleeve 3222 automatically rotates by an angle upon pressing the adjustment button 1311; and since the worm sleeve 3222 is in a rotation linkage relationship with the connecting seat 3223, when the worm sleeve 3222 rotates by an angle, the connecting seat 3223 synchronously rotate by the same angle along with the worm sleeve 3222, and since the third saw teeth 2231 on the connecting seat 3223 mesh with the connecting gear 3224 fixedly connected to the guide 12, while the connecting seat 3223 rotates, the connecting gear 3224 and the guide 12 rotate instantly with the rotation of the connecting seat 3223 by virtue of the transmission of the third saw teeth 2231. In this way, a complete linkage mechanism is formed from the adjustment button 1311 to the guide 12, so as to achieve the purpose of adjusting the angle of the passage hole 121 of the guide 12 relative to the reel assembly 20. In the retrieving state of the baitcast reel, the movement space for the fishing line 21 in the passage hole 121 is reduced, as shown in FIG. 4. In this case, the passage hole 121 is offset, and a major axis of the passage hole 121 in the form of an oval hole is substantially at an right angle to an axis of the reel assembly 20, and the active passage space of the passage hole 121 is minimized, such that the fishing line 21 may be uniformly wound around the reel assembly 20 during retrieving. In the pitching state of the baitcast reel in which a bait is cast, the movement space for the fishing line 21 in the passage hole 121 may be increased. As shown in FIG. 5, the guide 12 rotates by 90° instantly upon pressing the adjustment button 1311, in this case, the passage hole 121 faces the reel assembly 20, the major axis of the passage hole 121 in the form of an oval hole is parallel to the axis of the reel assembly and the active passage space of the passage hole 121 is maximized, providing enough space for the fishing line 21 to run at a high speed in the guide 12. It may be understood that after pitching is completed, the adjustment button 1311 may be reset, and the guide 12 returns to its original position accordingly.

In summary, it can be seen that the active passage space of the passage hole 121 of the guide 12 of the reel line guide device 10 of the present disclosure is switched during pitching and retrieving as required, and instant switching of the active passage space of the passage hole 121 from small to large or from large to small is enabled, which not only ensures that the fishing line 21 is arranged uniformly, smoothly and attractively on the reel assembly 20 during retrieving, and more importantly, also provides enough space for the fishing line 21 to run at a high speed in the guide 12 during bait casting by means of the reel assembly, such that the undesirable limitations on the running speed and the running trajectory of the fishing line 21 due to the friction between the fishing line 21 and the inner wall of the guide 12 are avoided or reduced as much as possible, the satisfaction with the casting distance and the water entry point of the bait is greatly improved, the catch success rate is increased, and the experience and fishing fun of an angler are greatly enhanced.

Figure 6:
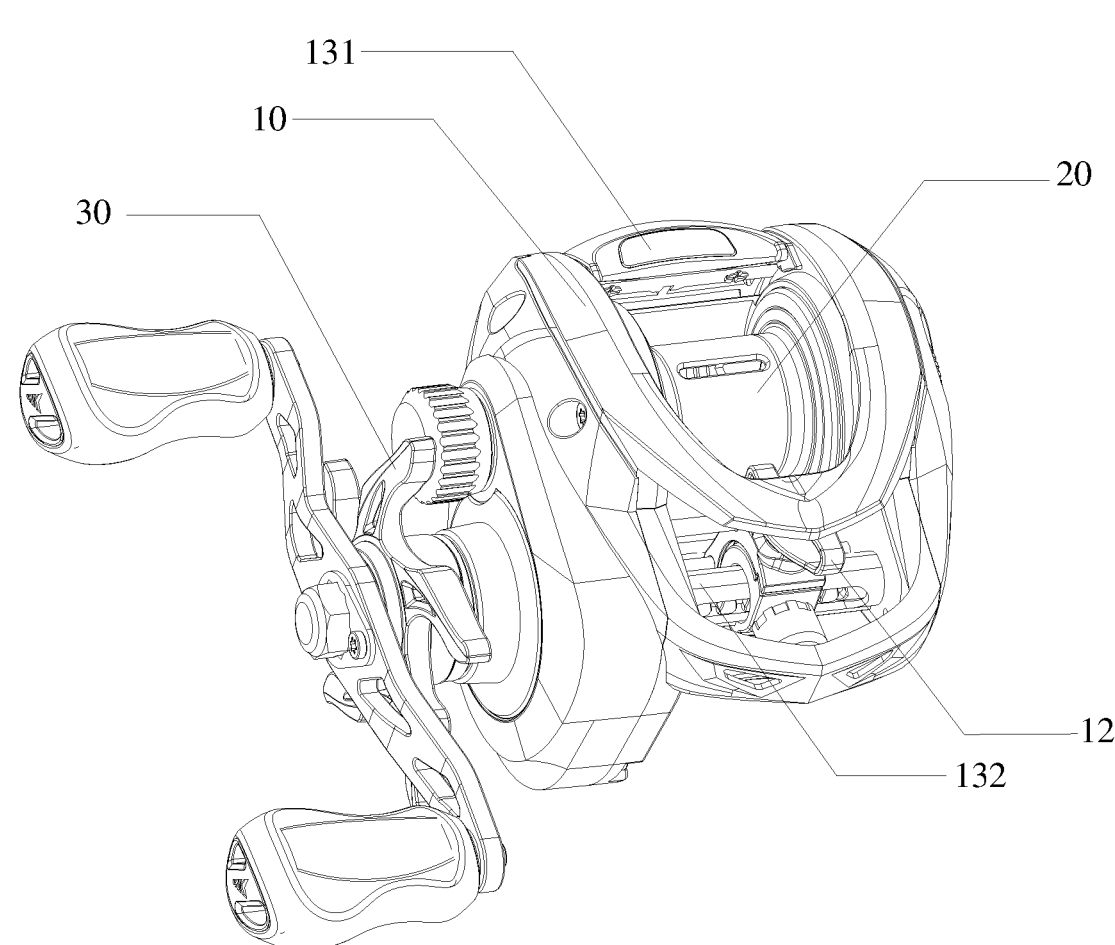
FIG. 6 is a schematic structural view of a specific embodiment of a baitcast reel of the present disclosure.

Referring to FIG. 6, FIG. 6 is a schematic structural view of a specific embodiment of a baitcast reel of the present disclosure. In order to illustrate a structure such as the reel assembly more visually, the fishing line is not shown in the figure. In the embodiment shown in the figure, the baitcast reel 100 includes a fishing reel body 30, a reel line guide device 10 assembled on the fishing reel body and a reel assembly 20. The reel assembly 20 is arranged on the reel line guide device 10 at a mounting position and is connected to the fishing reel body 30, such that the fishing line wound around the reel assembly 20 is retrieved or pitched under the control of the fishing reel body 30. The reel line guide device 10 is a reel line guide device as described in the above-mentioned embodiment. The guide 12 of the reel line guide device 10 rotates under the action of the button assembly 131 to adjust the angle of the passage hole 121 of the guide 12 relative to the reel assembly 20 in such a way that the movement space for the fishing line in the passage hole 121 may be increased when the reel assembly 20 of the baitcast reel 100 is in the pitching state, so as to reduce the friction between the fishing line and the inner wall of the passage hole 121, and that the movement space for the fishing line may be reduced when the baitcast reel is in the retrieving state. It may be understood that both the fishing reel body 30 and the reel assembly 20 in this embodiment are well known to those skilled in the art, and specific structures thereof will not be repeated herein.

In some other embodiments, the present disclosure may further provide a fishing tackle including the above-mentioned baitcast reel. The structures of the fishing tackle other than the baitcast reel may be similar to those of a common fishing tackle in the prior art, for example, a fishing rod, a fishing line, etc may be provided. The structures thereof are known to those skilled in the art, and are not repeated herein.

The above descriptions are merely preferred embodiments of the present disclosure, and are not intended to limit the present disclosure in any form. Various equivalent alterations and improvements may be made by those skilled in the art on the basis of the above-mentioned embodiments, and all equivalent changes or modifications made within the scope of the claims shall fall within the scope of protection of the present disclosure.

What is claimed is:

1. A reel line guide device for use in a baitcast reel, the reel line guide device comprising:
    a mount provided with a mounting position for accommodating a reel assembly;
    a guide arranged on the mount and positioned on one side of the mounting position, the guide being provided with a passage hole for a fishing line on the reel assembly to pass through; and
    a button transmission mechanism arranged on the mount and comprising a button assembly and a transmission assembly, the transmission assembly being connected to the button assembly and the guide to drive the guide to rotate under the action of the button assembly, so as to adjust an angle of the passage hole of the guide relative to the reel assembly in such a way that a movement space for the fishing line in the passage hole is increased when the baitcast reel is in a pitching state, so as to reduce the friction between the fishing line and an inner wall of the passage hole, and that the movement space for the fishing line is reduced when the baitcast reel is in a retrieving state;
    wherein the transmission assembly comprises a clutch cam provided with first saw teeth on a side, and a transmission gear set, the transmission gear set comprising a worm located on one side of the guide, a worm sleeve sleeved on the worm, a connecting seat sleeved on the worm sleeve and movable along with the worm sleeve, and a connecting gear fixed to the guide, wherein second saw teeth that mesh with the first saw teeth and third saw teeth that mesh with the connecting gear are respectively arranged on the worm sleeve and the connecting seat, and the button assembly is connected to the clutch cam so as to force the clutch cam to rotate by means of the button assembly, thereby driving the connecting gear to rotate, such that the guide rotates, along with the connecting gear, to the left or right relative to the reel assembly to adjust the angle of the passage hole of the guide relative to the reel assembly.

2. The reel line guide device of claim 1, wherein the transmission gear set further comprises a first transmission gear and a second transmission gear arranged on the mount, the first transmission gear meshing with the first saw teeth and the second transmission gear, and the second saw teeth on the worm sleeve meshing with the second transmission gear.

3. A baitcast reel, comprising: a fishing reel body, a reel line guide device assembled on the fishing reel body, and a reel assembly, the reel assembly being arranged at a mounting position, and the reel line guide device being the reel line guide device of claim 2.

4. A fishing tackle, comprising: a baitcast reel of claim 3.

5. The reel line guide device of claim 1, wherein the button assembly comprises an adjustment button, a connecting rod, and a ring, a connecting post is arranged on a surface of the mount, the clutch cam is fixed to the ring, and the ring is sleeved on the connecting post and is connected to the adjustment button by means of the connecting rod, such that the ring is capable of rotating around the connecting post upon pressing the adjustment button.

6. A baitcast reel, comprising: a fishing reel body, a reel line guide device assembled on the fishing reel body, and a reel assembly, the reel assembly being arranged at a mounting position, and the reel line guide device being the reel line guide device of claim 5.

7. A fishing tackle, comprising: a baitcast reel of claim 6.

8. The reel line guide device of claim 1, wherein the transmission gear set further comprises a fixing fork, one end of the fixing fork is in the form of a U-shaped opening, the worm sleeve is provided with a slot, and the U-shaped opening penetrates the connecting seat and the slot and is engaged to the worm, and the other end of the fixing fork is mounted in tight fit with the connecting seat.

9. A baitcast reel, comprising: a fishing reel body, a reel line guide device assembled on the fishing reel body, and a reel assembly, the reel assembly being arranged at a mounting position, and the reel line guide device being the reel line guide device of claim 8.

10. A fishing tackle, comprising: a baitcast reel of claim 9.

11. The reel line guide device of claim 1, wherein the reel line guide device further comprises a guide seat fixed to the mount, and one end of the guide penetrates the guide seat and is then connected to the transmission assembly.

12. A baitcast reel, comprising: a fishing reel body, a reel line guide device assembled on the fishing reel body, and a reel assembly, the reel assembly being arranged at a mounting position, and the reel line guide device being the reel line guide device of claim 11.

13. A fishing tackle, comprising: a baitcast reel of claim 12.

14. The reel line guide device of claim 1, wherein the passage hole is an oval hole.

15. A baitcast reel, comprising: a fishing reel body, a reel line guide device assembled on the fishing reel body, and a reel assembly, the reel assembly being arranged at a mounting position, and the reel line guide device being the reel line guide device of claim 14.

16. A baitcast reel, comprising: a fishing reel body, a reel line guide device assembled on the fishing reel body, and a reel assembly, the reel assembly being arranged at a mounting position, and the reel line guide device being the reel line guide device of claim 1.

17. A fishing tackle, comprising: a baitcast reel of claim 16.

* * * * *